United States Patent [19]

Fitoussi et al.

[11] Patent Number: 4,499,058
[45] Date of Patent: Feb. 12, 1985

[54] LIQUID/LIQUID EXTRACTION OF ACIDIC AQUEOUS STREAMS COMPRISING SULFATE/TITANIUM/IRON VALUES

[75] Inventors: Richard Fitoussi; Alain Leveque, both of Paris; Jean-Louis Sabot, Maisons-Laffitte, all of France

[73] Assignee: Rhone-Poulenc S.A., Courbevoie, France

[21] Appl. No.: 475,739

[22] Filed: Mar. 16, 1983

[30] Foreign Application Priority Data

Mar. 19, 1982 [FR] France ............................... 82 04684

[51] Int. Cl.$^3$ ..................... C01G 23/00; B01D 11/04; C01B 17/90
[52] U.S. Cl. .......................................... 423/70; 423/63; 423/522; 423/DIG. 14; 216/631; 216/681
[58] Field of Search ..................... 423/70, 86, 82, 139, 423/530, 616, 610

[56] References Cited

U.S. PATENT DOCUMENTS

| | | |
|---|---|---|
| 2,589,909 | 3/1952 | Weikel .................................. 423/82 |
| 3,067,010 | 12/1962 | Long et al. ............................ 423/70 |
| 3,104,950 | 9/1963 | Ellis ...................................... 423/70 |
| 3,529,932 | 9/1970 | Imoto et al. .......................... 423/70 |
| 4,269,809 | 5/1981 | Tolley et al. .......................... 423/70 |

FOREIGN PATENT DOCUMENTS

| | | |
|---|---|---|
| 90692 | 10/1983 | European Pat. Off. .............. 423/70 |
| 1322201 | 2/1963 | France . |
| 970885 | 9/1964 | United Kingdom .................. 423/70 |

OTHER PUBLICATIONS

Tedesco et al., *Journal of Inorganic and Nuclear Chemistry*, vol. 42, pp. 1033–1036 (1980).
Islam et al., *Journal of Inorganic & Nuclear Chemistry*, vol. 40, pp. 559–566 (1978).
*Chemical Abstracts*, vol. 77 (1972), No. 25,421r.
*Chemical Abstracts*, vol. 85 (1977), No. 127612m.
*Chemical Abstracts*, vol. 89 (1978), No. 218329y.
*Chemical Abstracts*, vol. 90 (1979), No. 174062v.
*Chemical Abstracts*, vol. 90 (1979), No. 189201p.
*Chemical Abstracts*, vol. 91 (1979), No. 79529q.
*Chemical Abstracts*, vol. 96 (1982), No. 87928n.

*Primary Examiner*—Brian E. Hearn
*Assistant Examiner*—N. Thane
*Attorney, Agent, or Firm*—Burns, Doane, Swecker & Mathis

[57] ABSTRACT

Acidic aqueous phases comprising sulfate ion and particularly sulfuric acid values, titanium ion and particularly titanium (IV) values, and iron ion, particularly iron (II) values, and advantageously waste streams emanating from a sulfate process for the production of $TiO_2$, are extracted with an initial organic phase which comprises at least one neutral organic extractant having the general formula:

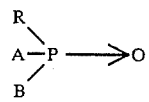

in which A and B, which may be the same or different, are the groups $R_1$ or $OR_2$, wherein $R_1$ and $R_2$ are straight or branched chain alkyl, alkenyl, alkynyl, alkoxyalkyl, aryl or alkylaryl radicals, or halogen substituted such radicals; and R is either $R_1$ or $R_2$ as above-defined, with R, $R_1$ and $R_2$ either being the same or different, or R is a group having the general formula:

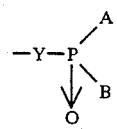

in which Y is a straight or branched chain alkylene radical, and A and B are as defined above, to provide a final aqueous phase comprising substantially all of said iron (II) values present in said initial aqueous phase and a final organic phase comprising substantially all of said sulfuric acid values and substantially all of said titanium values present in said initial aqueous phase; the respective iron/sulfate/titanium values may then be facilely recovered from their respective final phases.

20 Claims, No Drawings

LIQUID/LIQUID EXTRACTION OF ACIDIC AQUEOUS STREAMS COMPRISING SULFATE/TITANIUM/IRON VALUES

BACKGROUND OF THE INVENTION

1. Field of the Invention

The present invention relates to the extraction of acidic aqueous phases containing sulfate ions, in particular sulfuric acid, and additionally titanium, iron and in particular iron (II) ions, and possibly other metallic impurities. More especially, this invention relates to the extraction of solutions of residual sulfuric acid, which notably result from the sulfate process for the production of titanium dioxide, to respectively recover the sulfate/titanium and iron values therefrom.

2. Description of the Prior Art

It is of course a truism that sulfuric acid is one of the most widely used chemicals in industry. In many cases, the acid is dumped after use, which gives rise to pollution problems which become increasingly severe as the amounts of acid used increase.

Certain industrial processes and in particular the sulfate process for the production of pigmentary titanium dioxide produce large amounts of aqueous sulfuric acid, in a typical concentration by weight of from 10% to 50%, containing metal sulfates such as ferrous sulfates and titanium, as impurities. Such acid solution may also contain substantial amounts of other metal salts.

Said metal salts are in fact formed as by-products, for example, in the production of $TiO_2$, when the titaniferous raw material such as ilmenite is subjected to attack by, or acidulation with sulfuric acid, such metal salts being salts of aluminum, vanadium, chromium and manganese, in particular.

The iron content, primarily in the ferrous state, is generally in the range of from 5 to 100 g/l, while the titanium content is from 1 to 20 g/l.

It will be appreciated that the presence of one or more of the aforementioned metal salts in the residual aqueous acid gives rise to the danger of causing problems in regard to dumping it into a river or other land waters, or into the sea.

It may therefore be necessary to recover such residual acids, and such a recovery operation is moreover advantageous since, particularly as regards the production of titanium dioxide, such acids may represent 33% of the acid employed for acidulation of the ore.

However, the technique of concentrating a residual acid such as to permit its reuse for acidulating ilmenite, for example, 65% $H_2SO_4$, is seriously hindered by virtue of the precipitation of impurities, which causes the evaporator units to foul.

Moreover, it has also been found that it is an attractive prospect to recover the titanium contained in the residual acid. In fact, when producing titanium dioxide, the residual waters may contain a not inconsiderable portion of the production. For example, for a facility producing 180 t/day of $TiO_2$, between 5 and 25 t/day of $TiO_2$ contained in the residual waters is discharged into the sea.

A number of processes for treating acid solutions containing metal impurities by extraction by means of organic solvents such as neutral phosphoric acid esters and amines is known to the art.

However, it to date has proven impossible to develop a process enabling both purification of the residual solution and the recovery of titanium values therefrom.

SUMMARY OF THE INVENTION

Accordingly, a major object of the present invention is the provision of an improved process adapted to perform that dual function outlined immediately hereinabove.

Briefly, the process of the present invention features treating an acidic aqueous phase comprising sulfate ions, in particular sulfuric acid, titanium ions, in particular titanium (IV), and iron ions, in particular iron (II), by extracting said acidic aqueous phase with an initial organic phase comprising at least one organic extractant having the following general formula:

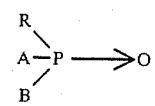

in which A and B are the groups $R_1$ or $OR_2$, wherein A and B may be identical or different, and $R_1$ and $R_2$ are straight or branched chain alkyl, alkenyl, alkynyl, alkoxyalkyl, aryl or alkylaryl radicals, or halogen substituted such radicals; and (i) either R is a radical of the same type as those defined hereinbefore in respect of $R_1$ and $R_2$, with R, $R_1$ and $R_2$ being identical or different; or (ii) R is a group having the general formula:

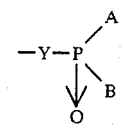

in which Y is a straight or branched chain alkylene group, preferably containing from 1 to 12 carbon atoms, with A and B being as above-defined; and thence recovering a final aqueous phase comprising substantially all of the Fe (II) ions present in the initial aqueous phase and a final organic phase comprising substantially all of the sulfuric acid and all of the titanium ions present in said initial aqueous phase.

DETAILED DESCRIPTION OF THE INVENTION

More particularly according to this invention, it will be seen that the proposed use of a well-defined class of organic extractants permits the simultaneous extraction and ultimate recovery of sulfuric acid and titanium values and enables separation thereof from the metal impurities, in particular iron (II).

The initial aqueous phase is therefore an acidic phase containing sulfate ions, in particular sulfuric acid, titanium ions, in particular titanium (IV), and iron ions, in particular Fe (II). The aqueous phase may be a residual acid phase resulting from a process entailing the use of sulfuric acid.

Generally, and in particular in the case of a residual acid phase resulting from a process for the production of $TiO_2$ from ilmenite, that phase may have a sulfuric acid concentration of from about 10% to 50% by weight, more particularly from 20% to 40%.

The titanium content typically ranges from about 1 to 20 g/l and in particular from 3 to 15 g/l.

The proportion of iron sulfate, primarily ferrous sulfate, expressed in terms of iron, is typically in the range of from about 5 to 100 g/l, and in particular from 10 to 70 g/l.

In addition, and as indicated hereinbefore, the initial aqueous phase may contain metal ions of at least one of the following elements: aluminum, chromium, manganese, calcium and vanadium.

Also present may be such other elements as zinc, copper, magnesium, nickel, lead or arsenic, albeit same are present in smaller amounts, particularly in the case of residual acid solutions resulting from an ilmenite attack process.

The initial acid aqueous solution may optionally be subjected, before the treatment/extraction according to the invention, to a pre-concentration step with separation of the sulfates, in particular ferrous sulfate, which crystallize out.

The initial organic solution comprises at least one organic extractant of the type indicated above, it being appreciated that the extracting agents may be admixed with each other.

The subject organic extractants are organophosphorus compounds of the neutral oxygen donor atom type. They may be of the phosphonate type, such as, for example, dibutyl butylphosphonate (DBBP), di-(2-ethylhexyl) 2-ethylhexylphosphonate (DEHEHP), bis($\beta$-chloroethyl)vinylphosphonate, tetraethyl decylene diphosphonate $(C_2H_5O)_2OP—CH_2—(CH_2)_8—CH_2—PO(OC_2H_5)_2$, tetraethyl butylene diphosphonate $(C_2H_5O)_2$ $OP—CH_2—(CH_2)_2—CH_2—PO(OC_2H_5)_2$, and tetraisopropyl methyl methylene diphosphonate $(iC_3H_7O)_2OP—CH(CH_3)—PO(iC_3H_7O)$.

They may also be of the phosphinate type, such as, for example, dioctylmethylphosphinate.

The extractants may also be phosphine oxides, such as, for example, oxides of di-n-hexylmethoxyoctylphosphine (DHMOPO), tri-n-butylphosphine (TBPQ) and trioctylphosphine (TOPO).

In certain instances, it is advantageous to use an organic phase which comprises at least one organic extractant of the above-indicated type, in solution in a diluent.

In fact, because of their physical properties in particular, certain extractants cannot be used in the pure state for extraction of the initial aqueous phase. In such a case, besides its solubilizing action, the diluent also has a favorable effect on the physical properties of the extractant or extractants, by reducing, for example, the viscosity or the density of the organic phase.

The diluents, which may be used alone or in the form of mixtures, may be compounds such as aromatic or aliphatic hydrocarbons, alcohols, organic acids, ethers, halogenated solvents, ketones and alkylphosphates.

The level of concentration of the extractant or extractants in the diluent may range from about 10% to 90% by weight. That level of concentration depends in particular on the physical properties which are to be achieved in respect of the initial organic phase.

The temperature at which the initial aqueous and organic phases are brought into contact does not appear to be critical. The temperature may be set by the process which gives rise to the residual aqueous phase that is to be treated. The temperature may also depend on the nature of the extractant employed. In practice, the temperature will range from about ambient temperature to about 80° C.

The operation of bringing the above-mentioned two phases into contact and the extraction operation are effected in known manner in a known apparatus of the mixer-settler or column type, for example.

The extraction itself is advantageously carried out continuously and countercurrently, over a plurality of stages.

After the contacting operation, the product obtained is a final aqueous phase comprising substantially all of the Fe (II) ions present in the initial aqueous phase and possibly substantially all of the ions of other metal impurities, such as aluminum, chromium, manganese and calcium, when such elements are indeed present in the initial acidic aqueous phase.

The organic phase contains substantially all of the sulfuric acid and all of the titanium ions present in the initial aqueous phase, which have been selectively extracted therefrom.

It will be appreciated that the process of the invention also makes it possible to selectively extract a substantial proportion of elements of high economic value, such as, for example, vanadium, from the residual initial aqueous phase, when that phase indeed contains such elements.

The final organic phase can then be treated using any known means, for example, by re-extraction or back extraction with water, to recover the different elements that it contains, in particular sulfuric acid and titanium.

Inorder to further illustrate the present invention and the advantages thereof, the following specific examples are given, it being understood that same are intended only as illustrative and in nowise limitative.

EXAMPLE 1

A residual solution which, upon the pre-concentration thereof, had the composition as set forth below, was produced as a by-product of the sulfate process for producing titanium dioxide pigment by the attack or acidulation of ilmenite with $H_2SO_4$ at a level of concentration of 65% by weight:

| | | |
|---|---|---|
| (i) $H_2SO_4$ | 523 g/l | (38% by weight) |
| (ii) $SO_4^{2-}$ | 568 g/l | |
| (iii) $Cl^-$ | 1.13 g/l | |
| (iv) Fe | 25.8 g/l | |
| (v) Ti | 9.12 g/l | |
| (vi) Al | 4.02 g/l | |
| (vii) Mn | 4.57 g/l | |
| (viii) Cr | 272 mg/l | |
| (ix) V | 751 mg/l | |
| (x) Zn | 86 mg/l | |
| (xi) Cu | 76 mg/l | |
| (xii) Ca | 435 mg/l | |
| (xiii) Mg | 81 mg/l | |
| (xiv) Ni | 3.9 mg/l | |
| (xv) Pb | 6.2 mg/l | |
| (xvi) As | 0.4 mg/l | |

An extraction thereof was carried out utilizing different organophosphorus compounds of the family comprising phosphine oxides, phosphonates and phosphinates. Such extractants were employed in the pure state.

The operation was performed at a temperature of 25° C. (except when using TOPO and TBPO). One liter of residual acid solution was agitated with one liter of organic solvent. After settling and separation, analysis of the various aqueous and organic phases made it possible to calculate the levels of removal of sulfuric acid and titanium from the aqueous phase.

These various results are summarized in the Table I which follows. In regard to TOPO and TBPO, the temperatures specified were those at which each operation was effected.

TABLE I

| Solvents | $H_2SO_4$ | | |
|---|---|---|---|
| | Initial aqueous phase concentration | Aqueous Phase concentration after extraction | Extent of removal |
| DBBP | 523 g/l | 397 g/l | 24% |
| DHMOPO | 523 g/l | 402 g/l | 23% |
| Bis-($\beta$-chloroethyl) vinylphosphonate | 523 g/l | 365 g/l | 30% |
| TBPO 70° C. | 523 g/l | 293 g/l | 56% |
| TOPO 50° C. | 523 g/l | 392 g/l | 25% |
| DEHEHP | 523 g/l | 443 g/l | 15% |
| TBP (tri-n-butylphosphate) | 523 g/l | 408 g/l | 22% |
| Dioctylmethylphosphinate | 523 g/l | 345 g/l | 34% |

| Solvents | Titanium | | |
|---|---|---|---|
| | Initial concentration | Final concentration | Extent of removal |
| DBBP | 9.12 g/l | 4.98 g/l | 45% |
| DHMOPO | 9.12 g/l | 1.27 g/l | 86% |
| Bis-($\beta$-chloroethyl) vinylphosphonate | 9.12 g/l | 7.38 g/l | 19% |
| TBPO | 9.12 g/l | 1.38 g/l | 84% |
| TOPO | 9.12 g/l | 0.85 g/l | 91% |
| DEHEHP | 9.12 g/l | 1.57 g/l | 83% |
| TBP | 9.12 g/l | 9.05 g/l | <1% |
| Dioctylmethylphosphinate | 9.12 g/l | 0.7 g/l | 92% |

| Solvents | Iron | | |
|---|---|---|---|
| | Initail concentration | Final concentration | Extent of removal |
| DBBP | 25.6 g/l | 24.05 g/l | 6% |
| DEHEHP | 25.6 g/l | 24.75 g/l | 3% |
| DHMOPO Bis-($\beta$-chloroethyl) vinylphosphonate TBPO, TOPO Dioctylmethyl phosphinate | 25.6 g/l | | <5% |

EXAMPLE 2

This Example employed an aqueous phase having the same composition as that used in Example 1.

1 liter of the residual acid was contacted with 1 liter of various neutral organophosphorus compounds. The latter were used either in the form of mixtures with each other, or in a state of dilution in an organic diluent. The extraction operation was carried out at a temperature of 25° C.

Analysis of the various aqueous and organic phases enabled determination of the levels of removal of $H_2SO_4$ and Ti which were initially present in the aqueous phase. The results are set forth in the following Table II. The proportions specified in respect of the mixtures are by weight.

TABLE II

| Solvents | Extent of removal | |
|---|---|---|
| | $H_2SO_4$ | Ti |
| 50% DBBP - 50% DHMOPO | 27% | 87% |
| 80% DBBP - 20% DHMOPO | 27% | 85% |
| TOPO 35%, decanol 45%, kerosene 20% | 18% | 82% |
| TOPO 10%, DHMOPO 70%, kerosene 20% | 21% | 97% |
| TOPO 35%, versatic acid 25%, kerosene 40% | 8% | 81% |
| TOPO 35%, Methyl isobutyl ketone 65% | 14% | 74% |
| TOPO 10%, DBBP 90% | 27% | 88% |

EXAMPLE 3

This Example used two solutions of impure sulfuric acids resulting from the sulfate process for the production of titanium dioxide. Sample A was of the typical composition of the mother liquors, while Sample B was an acid which had been subjected to a pre-concentration step with crystallization of the ferrous sulfate which had been separated off.

| Sample A | | Sample B | |
|---|---|---|---|
| $H_2SO_4$ | 268 g/l (23%) | $H_2SO_4$ | 523 g/l (38%) |
| Fe | 48.4 g/l | Fe | 25.8 g/l |
| Ti | 4.26 g/l | Ti | 9.12 g/l |

Each of the aforesaid samples was used to carry out a series of ten successive contacting steps in flasks, with fractions of dibutyl butylphosphonate. Operation was effected at a temperature of 25° C.

Operation was then continued in the same manner, but using TBP as the solvent.

When using sample A, DBBP resulted in a raffinate containing 5% of $H_2SO_4$ by weight, while TBP resulted in a raffinate with 10.5% of $H_2SO_4$.

When using sample B, DBBP resulted in a raffinate containing 5% of $H_2SO_4$ by weight while TBP resulted in a raffinate containing 13% of $H_2SO_4$.

It will therefore be seen that sulfuric acid is extracted with a much higher degree of efficiency when using DBBP than when using TBP.

EXAMPLE 4

The residual acid of Example 1 will now be considered.

A continuous extraction was carried out, using DBBP, over 6 theoretical stages operating countercurrently, with a ratio between the flow rates by volume of organic phase and aqueous phase, of approximately 3. The temperature was fixed at 25° C.

The organic phase was then subjected to a re-extraction operation using water over 6 theoretical stages, with a ratio between the flow rates by volume of organic phase to aqueous phase of 3.

Table III reports the composition of the raffinate produced after extraction by the organic phase, and the level of extraction.

It was found that there was a level of recovery of 91% in respect of $H_2SO_4$ and 92% in respect of titanium in the organic phase. On the other hand, the other metal impurities: iron, aluminum, manganese, calcium and chromium remained for the most part in the raffinate.

Moreover, it will be appreciated that an economically attractive element, vanadium, was also extracted and recovered to a substantial degree.

TABLE III

| Composition | Initial impure acid | Raffinate | Extent of extraction |
|---|---|---|---|
| $H_2SO_4$ | 523 g/l | 78 g/l | 91% |

TABLE III-continued

| Composition | Initial impure acid | Raffinate | Extent of extraction |
|---|---|---|---|
| Fe | 25.8 g/l | 24.7 g/l | 5% |
| Ti | 9.12 g/l | 0.9 g/l | 92% |
| Al | 4.02 g/l | 5 g/l | <1% |
| Mn | 4.57 g/l | 5.6 g/l | 8% |
| Cr | 272 mg/l | 330 mg/l | 3% |
| V | 751 mg/l | 700 mg/l | 27% |
| Ca | 435 mg/l | 520 mg/l | 3% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the treatment of an acidic aqueous phase containing sulfate ion and particularly sulfuric acid values, titanium ion and particularly titanium (IV) values, and iron ion, particularly iron (II) values, comprising (i) extracting said aqueous phase with an initial organic phase which comprises at least one organic extractant having the general formula:

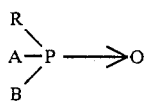

in which A and B, which may be the same or different, are the groups $R_1$ or $OR_2$, wherein $R_1$ and $R_2$ are straight or branched chain alkyl, alkenyl, alkynyl, alkoxyalkyl, aryl or alkylaryl radicals, or halogen substituted such radicals; and R is either $R_1$ or $R_2$ as above-defined, with R, $R_1$ and $R_2$ either being the same or different, or R is a group having the general formula:

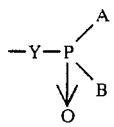

in which Y is a straight or branched chain alkylene radical, and A and B are as defined above; and thence (ii) recovering a final aqueous phase comprising substantially all of said iron (II) values present in said initial aqueous phase and a final organic phase comprising substantially all of said sulfuric acid values and substantially all of said titanium values present in said initial aqueous phase.

2. The process as defined by claim 1, wherein the initial organic phase comprises the at least one organic extractant in solution in a diluent.

3. The process as defined by claim 2, wherein said diluent comprises at least one aromatic or aliphatic hydrocarbon, alcohol, organic acid, ether, halogenated solvent, ketone and alkyl-phosphate.

4. The process as defined by claim 2, wherein the degree of concentration of said organic extractant in the diluent ranges from about 10% to 90% by weight.

5. The process as defined by claim 1, said at least one organic extractant comprising a phosphine oxide.

6. The process as defined by claim 5, phosphine oxide comprising di-n-hexylmethoxyoctylphosphine oxide, tri-n-butylphosphine oxide or trioctylphosphine oxide.

7. The process as defined by claim 1, said at least one organic extractant comprising a phosphonate.

8. The process as defined by claim 7, said phosphonate comprising dibutyl butylphosphonate, di-(2-ethylhexyl) 2-ethylhexylphosphonate or bis($\beta$-chloroethyl)-vinylphosphonate.

9. The process as defined by claim 1, said at least one organic extractant comprising a phosphinate.

10. The process as defined by claim 9, said phosphinate comprising dioctylmethylphosphinate.

11. The process as defined by claim 1, said at least one organic extractant comprising admixture of dibutyl butylphosphonate with trioctylphosphine oxide or di-n-hexylmethoxyoctylphosphine oxide.

12. The process as defined by claim 1, said at least one organic extractant comprising admixture of trioctylphosphine oxide with methylisobutyl ketone, or with versatic acid and kerosene, or with decanol and kerosene, or with kerosene and di-n-hexylmethoxyoctylphosphine oxide.

13. The process as defined by claim 1, wherein said initial aqueous phase further comprises vanadium values, and said final organic phase comprises a substantial fraction of the vanadium values present in said initial aqueous phase.

14. The process as defined by claim 1, wherein said initial aqueous phase further comprises aluminum, chromium, manganese or calcium values, or admixtures thereof, and said final aqueous phase comprises substantially all of such values.

15. The process as defined by claim 1, wherein said initial aqueous phase is continuously and countercurrently extracted with said initial organic phase.

16. The process as defined by claim 1, wherein said initial aqueous phase is concentrated prior to extraction with said initial organic phase.

17. The process as defined by claim 1, wherein said final organic phase is re-extracted with water to recover a third aqueous phase comprising said sulfuric acid and titanium values.

18. The process as defined by claim 1, said initial aqueous phase comprising a solution of residual sulfuric acid emanating from a sulfate process for the production of titanium dioxide.

19. The process as defined by claim 1, wherein R is

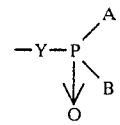

and Y contains from 1 to 12 carbon atoms.

20. The process as defined by claim 1, wherein said initial aqueous phase further comprises zinc, copper, magnesium, nickel, lead or arsenic values, or admixtures thereof.

* * * * *